United States Patent [19]
Wollschläger et al.

[11] Patent Number: 5,720,918
[45] Date of Patent: Feb. 24, 1998

[54] METHOD AND APPARATUS FOR CLOSING TOOL OF PLASTICS PROCESSING MACHINE

[75] Inventors: Dieter Wollschläger, Königswinter; Rudolf Maier, Lohmar; Axel Helmenstein, Wiehl, all of Germany

[73] Assignee: Fischer—W. Müller Blasformtechnik GmbH, Germany

[21] Appl. No.: 637,107

[22] Filed: Apr. 24, 1996

[30] Foreign Application Priority Data

May 3, 1995 [DE] Germany ............ 195 16 125.4

[51] Int. Cl.⁶ .................... B29C 33/24; B29C 49/56
[52] U.S. Cl. ............ 264/540; 425/150; 425/451.2; 425/451.9; 425/541
[58] Field of Search .................. 425/150, 541, 425/451.2, 451.9; 264/40.5, 523, 540

[56] References Cited

U.S. PATENT DOCUMENTS

| | | | |
|---|---|---|---|
| 2,916,768 | 12/1959 | Quere et al. | 425/451.2 |
| 4,248,583 | 2/1981 | Hedke et al. | 425/541 |
| 4,594,067 | 6/1986 | Langos | 425/451.9 |
| 4,822,274 | 4/1989 | Chan et al. | 425/451.2 |
| 5,562,934 | 10/1996 | Langos et al. | 425/541 |
| 5,618,487 | 4/1997 | Hettinga | 425/451.9 |

FOREIGN PATENT DOCUMENTS

| | | |
|---|---|---|
| 0 050 227 | 5/1984 | European Pat. Off. . |
| 1 604 575 | 11/1970 | Germany . |
| 2100868 | 7/1972 | Germany ............ 425/541 |
| 25 25 161 A1 | 12/1976 | Germany . |
| 25 42 015 B2 | 6/1979 | Germany . |
| 3416871 C2 | 9/1990 | Germany . |
| 758480 | 10/1956 | United Kingdom . |

*Primary Examiner*—Robert Davis
*Attorney, Agent, or Firm*—Hamilton, Brook, Smith & Reynolds, P.C.

[57] ABSTRACT

A method and an apparatus for closing the tool of a plastics-processing machine, especially a blow-molding machine, concerns a two-part tool (1, 2) which is supported by two tool mounting plates (3, 4), at least one run drive (5), at least two closure drives (8), and such that the closure drives (8) each have a hydraulic piston-cylinder system with a cylinder (9), a piston (10), and a cylinder rod (11), and such that an inflow (14) and an outflow (15) for hydraulic oil is situated at the cylinder (9). Also, the end of the piston rod (11) has an interlock element (12) which interacts with a counter-piece (13), such that the piston rod (11) does not interlock with the closure piece (13), in order to apply the closure force, until the tool (1, 2) is situated near its closed position. According to the invention, all the closure drives (8) for closing the tool (1, 2) with a high force are actuated by a common control or regulation mechanism; no synchronization devices between the individual closure drives 8 are present. The entire closure motion of the tool (1, 2) takes place continuously and without interruption of the closure process. In this way, a more economical mode of operation is achieved by a simpler and more economical design.

29 Claims, 3 Drawing Sheets

METHOD AND APPARATUS FOR CLOSING TOOL OF PLASTICS PROCESSING MACHINE

BACKGROUND OF THE INVENTION

The process for closing the blow mold or similar tool is divided into two phases in known plastics processing machines. In the first phase, the two halves of the tool are moved from a mold-removal position, open position, towards the closed position. Typically, more than 90% of the entire stroke is traversed during this phase, and a relatively small force is required. Run drives used to achieve this motion are generally long-stroke cylinders having a small piston surface area. During a second phase, closure drives are required to apply a large closure force to the blow-molding tool. The large closure force is required to, for example, apply the pinch-off force to the blow-mold parison, and function as a retention force against the pressures developed during the blow-molding or injection molding. Short-stroke cylinders with large piston surface areas are generally used during this phase.

Various prior art devices are concerned with the control of the transition from the run phase in which the run drives are operating to the closure phase in which the closure drives operate.

German Patent Document DE-34 16 871 C2 to Mauser-Werke GmbH describes a mold closing apparatus utilizing a transport mechanism that moves the two-halves of the blow-mold to the closed position and a locking device that then locks the blow-mold in the closed position. In order to uniformly distribute the closure and locking forces, the motion of the blow-mold is halted before it is completely closed. Then, the remain gap is closed by applying the force necessary to close the mold. Stopping the blow-mold before it is completely closed avoids transition problems between the run phase and the closure phase. The run drive and the closure drive only operate separately; they are never operating at the same time.

German Patent Document DE-AS 16 04 575 to Kautex Werke Reinold Hagen GmbH describes another closure method. Spindle-nut drives are used to close the mold. A relatively complicated synchronization system is required to close the mold halves without mismatch. A motor driven circulating chain drives the several spindles that close the mold. During the closure phase, a short-stroke spindle is engaged to obtain the force necessary to close the mold.

Finally, in European Patent Document EP 0 050 227 B1 to BASF, a blow-mold closing device is described in which the run drives are used to substantially close the mold. Then, wedges are applied in a direction that is perpendicular to the direction of closure into associated recesses on the mold. A high closure force is created as a result of the action of the wedges.

SUMMARY OF THE INVENTION

Each of the above-described methods and devices have their own respective drawbacks. In the first case, the halt in the motion between the run phase and the closure phase extends cycle time. The method using the spindle-nut drives is complicated and expensive to implement. Finally, the apparatus using the wedges requires precise time coordination of the wedge movement and is susceptible to jolts. While each in theory works well, high costs are generally involved in realizing these closure systems when reduced to practice. Moreover, coordination problems often arise in connection with the transition from the run phase to the closure phase. For this reason, a separate closure control loop for each closure drive is usually required, which further complicates the systems and renders them prone to malfunction.

The present invention concerns a tool closing method and associated apparatus which achieves a smooth and continuous transition between the run phase and the closure phase. All of the closure drives are actuated with a common control or regulation mechanism. Dedicated synchronization devices for the individual closure drives are not required, and the entire closure motion of the tool takes place continuously and without interruption. Accordingly, the present invention includes a defined hydraulic stream that is provided to closure cylinders after a piston rod interlocks with a counter-piece. An inflow to this cylinder is in communication with an outflow of the same cylinder by a check valve so that hydraulic fluid can flow from the outflow to the inflow. Outflow may also flow to a hydraulic tank through a pressure valve. This hydraulic network is capable of achieving a soft transition between the run and closure phases since the run drive can carry the closure drive along. Moreover, all of the closure drives are preferably commonly controlled to optimize the cycle time in the invention.

Specific embodiments of the invention also advantageously provides that, before the piston rod interlocks with the counter-piece, it is run into a defined position, especially a forward stop position. At the instant when the individual piston rods run into the locking claws, they therefore are in a defined or predetermined position. Thus, the piston rods of the individual closure drives are in this defined position before the locking process, such that the regulation-related monitoring of the respective piston rod positions in accordance with the prior art is obviated. This process step, in combination with the above measures, greatly simplifies the central control of the closure process.

In other specific embodiments, a defined hydraulic stream (dV/dt) is pumped into the closure cylinders via the inflow with any contributions received from the outflow via check valve after the piston rods interlocks with the counter-piece. Further, the cylinders of the closure drives are preferably designed with a length (L) so that the piston rods, together with the interlock elements situated at the ends, can be completely run out from the tool area or from the tool mounting plate. This advantageously facilitates the process of exchanging the tool.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
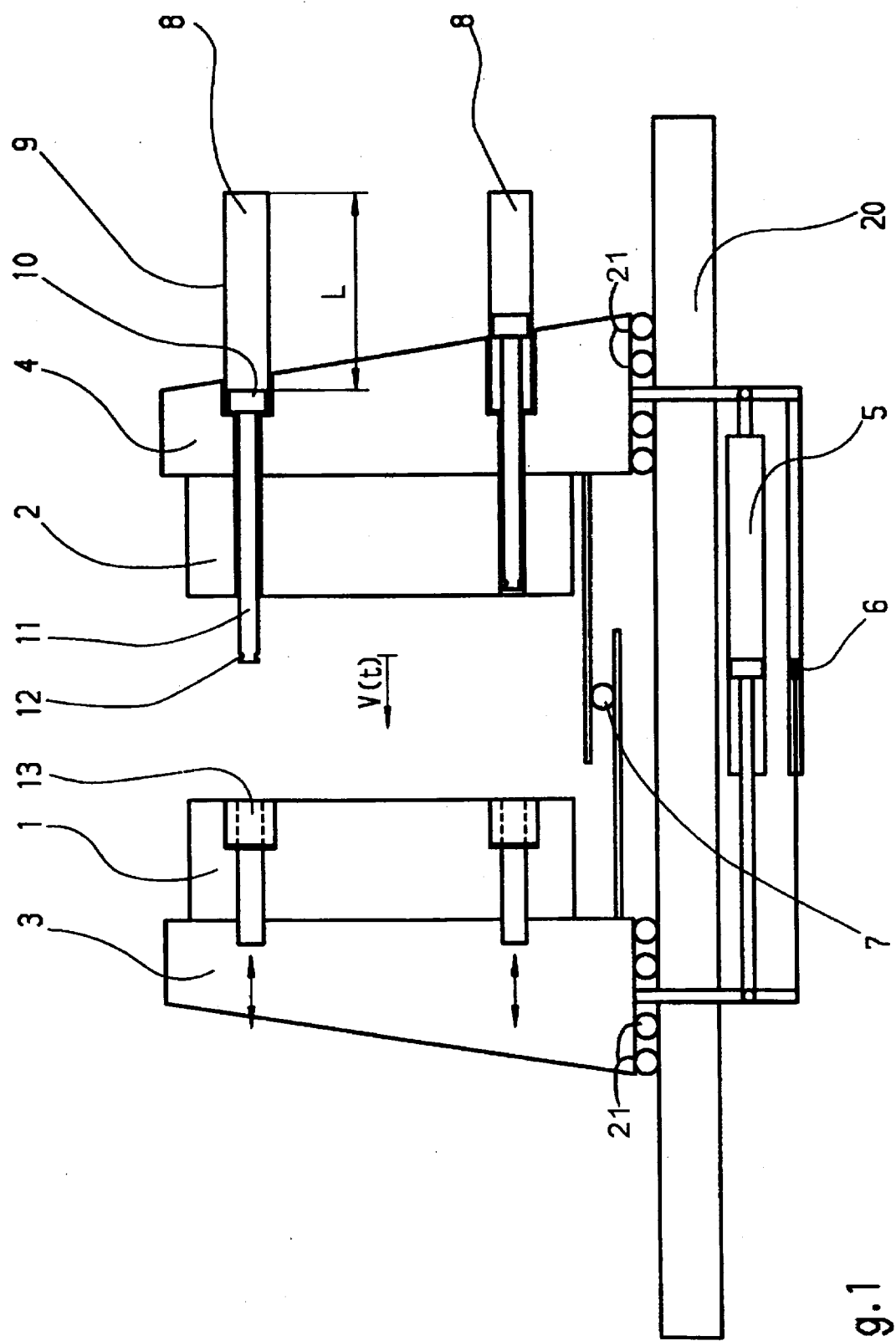
FIG. 1 is a schematic side view showing the structure of a blow-molding machine of the present invention.

FIG. 1 is a side cross-sectional view of a blow-molding machine, which has been constructed according to the principles of the present invention. A machine base 20 serves as a substantially horizontal foundation. Two mold mounting plates 3, 4 extend perpendicularly from the base 20. Each of these plates supports one-half of a blow-molding tool 1, 2. A storage head or similar device (not shown) produces the blow mold parisons and delivers them into the top to the tool area, where the parisons are processed by the blow-molding according to the well-known method. In order to accommodate the introduction of the parison on one hand and for enabling the removal of the finished work piece from the mold on the other hand, the mounting plates 3, 4 are adapted to linearly translate on the machine base 20. This functionality is indicated by rollers 21 located between the plates 3, 4 and the base 20.

A run drive 5 accomplishes the run motion from the completely open position of the tool 1, 2 in the direction of the closed position. The advancement or relative location of the tools 1, 2 is detected by a path sensor 6 and is reported to the machine controller, which is not shown here. In order to move the two tool mounting plates 3 and 4 symmetrically open and closed, the run motion of the run drive 5 acts in cooperation with a synchronizing element 7, which causes the two arms 1, 2 of the tool to move symmetrically with respect to the center axis (not shown here) of the closure mechanism. Naturally, the same effect can also be achieved by using two run drives 5.

In the present case, run drive 5 includes a hydraulic long-stroke cylinders with a comparatively small piston surface area, i.e., elements which can execute large displacement motions but only generate relatively small forces. As an alternative to this, naturally it is equally possible to use electrical or pneumatic run drives.

When the major portion of the entire closure path has been traversed, usually approximately 90%, the closure force is applied to the tool 1, 2 during the closure phase. Closure drives 8 serve this purpose. These are hydraulic piston-cylinder systems that can produce the relatively high closure forces over relatively shorter distances. A cylinder 9 accepts a piston 10 which is connected to a piston rod 11. In the present case, the cylinder 9 adjustably connects to the tool mounting plate 4. To transfer the closure force, the piston rod 11 interlocks with a counter-piece 13 when the tool 1, 2 is largely closed. The counter-piece 13 is here located in the tool half 1. However, to accommodate the respective height of the tool 1, 2 that is installed, the counter-pieces 13 can be adjusted laterally to enable adjustment to the required position, as indicated by the double arrows in FIG. 1. A locking element 12, which is situated at the end of the piston rod 11, is here engaged and held fast by the counter-piece 13; the counter-piece is adjustably fixed in the tool half 1.

Figure 2:
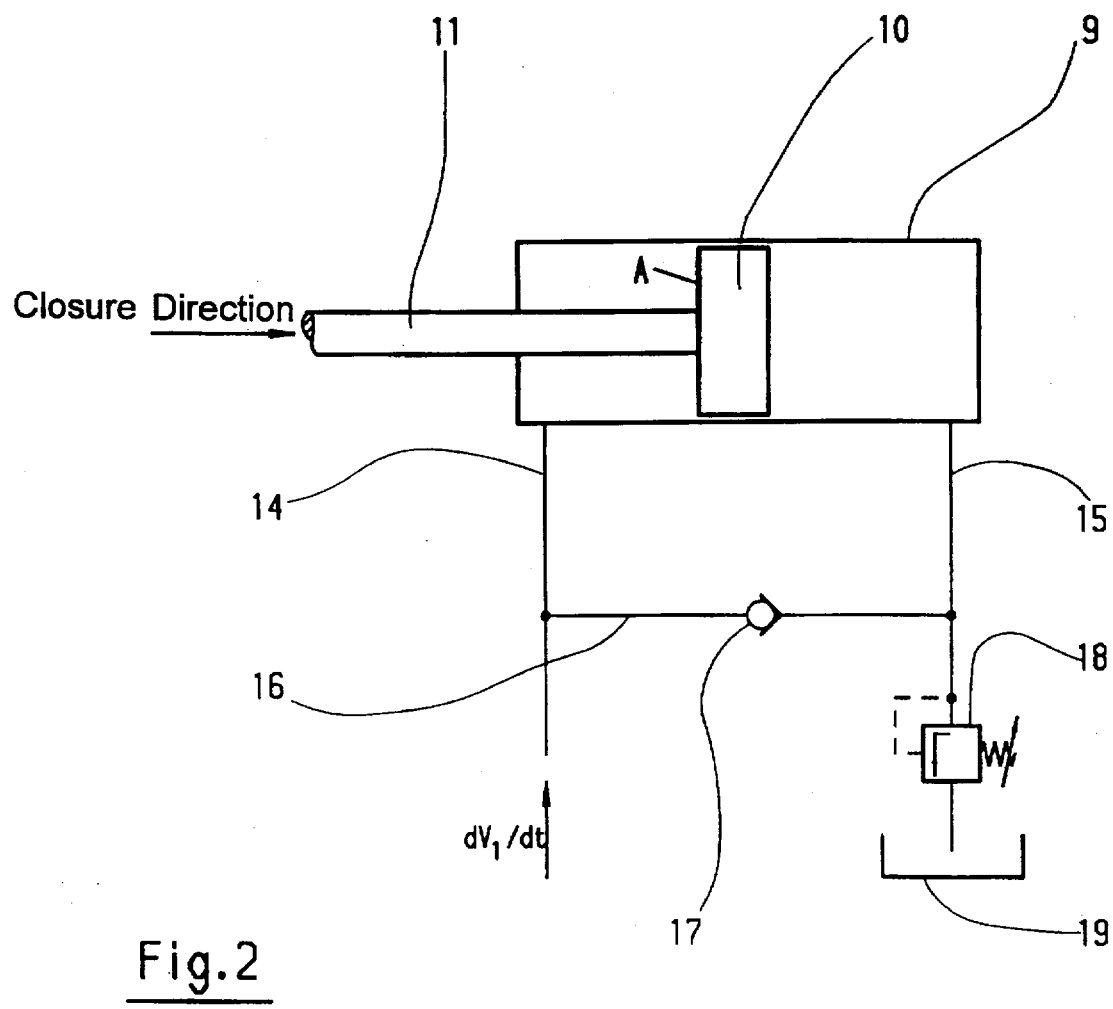
FIG. 2 is a schematic diagram showing the hydraulic network of a closure system of the present invention.

FIG. 2 shows the hydraulic network that generates closure force. As a matter of principle, hydraulic oil is pumped through an inflow 14 into the cylinder 9 in well-known fashion. As a result, the piston 10 and consequently the piston rod 11 will move in the cylinder in the "closure" direction.

According to the invention, all the closure drives 8 for closing the tool 1, 2 are actuated by a common control or regulation mechanism so that the equal volumes of fluid are pumped in the respective inflows 14 as a function of time. There is no synchronization between the individual closure drives. Despite the transition from the motion of the run drive 5 to that of the closure drives 8, the closure motion from the completely open position to the force-retention closure of the tool 1, 2 takes place continuously and without interruption of the closure process.

The following design reliably makes it possible for this to happen without complicated regulation and without misaligning the tool or the mounting plates.

The inflow 14 of each cylinder 9 is connected to the outflow 15, and specifically through a line 16. A check valve 17 is disposed in the latter, and specifically in such a fashion that hydraulic oil can flow from the outflow 15 to the inflow 14, if appropriate pressure conditions prevail. The outflow 15 furthermore is connected to the hydraulic tank 19 via a pressure valve 18. The pressure valve can be set to open in response to a selected pressure.

The invention now provides that after piston rod 11 is interlocked with the counter-piece 13, a defined hydraulic stream dV/dt is conducted via the inflow 14 into each cylinder 9. In this way, a gradual, soft building-up of force is produced in the closure drive, as derived from the following mode of operation.

Figure 3:
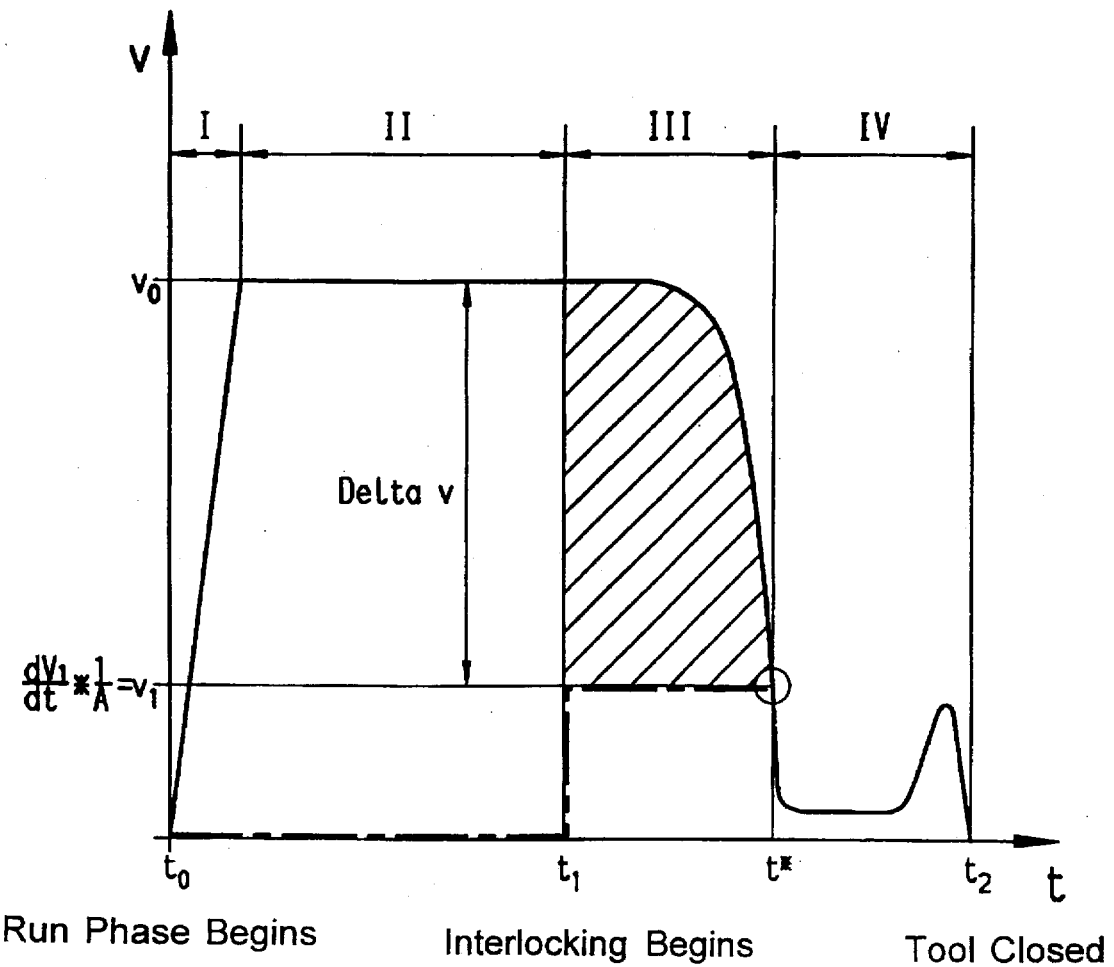
FIG. 3 is a graph showing the speed of one-half of the tool as a function of time according to the present invention.

FIG. 3 shows the speed v of the tool half 2 as a function of time. For simplicity, the information in the graph relates to a movable half 2 of the tool, which is run against a fixed half 1 of the tool. However, analogous considerations apply if one considers the relative speed of the two molds 1 and 2 in FIG. 1.

The movable half of the tool is accelerated by the run drive 5 to a speed $V_0$, see the solid curve in FIG. 3, in phase I. When the tool half 2 have moved far enough during phase II, so that the locking element 12 can engage its counter-piece 13, the piston rod 11 begins to interlock with the tool half 1. This event occurs at the end of phase II, $t_1$ - beginning of interlock). Until then—i.e., during phases I and II—the piston 10 was at rest in the cylinder 9 so that no hydraulic oil was flowing.

The case shown here is that a constant speed prevails in phase II. Alternatively, tool 2 could be decelerated near the end of phase II.

Beginning at time $t_1$, the instant when the locking elements 12 engage the counter-pieces, the piston rod 11 begins to move in the cylinder 9. When the piston rod enters the counter-piece 13, it is carried along by the momentum of the run drive 5. The oil is displaced from the right cylinder chamber (to the right of the piston 10), and oil can thus be filled into the left cylinder chamber (to the left of the piston 10). The oil is transferred via the connecting line 16. If the pressure valve 18 is appropriately set, the oil volume needed in the left cylinder chamber is first conducted via the outflow 15 and the line 16 to the inflow 14. However, since the displacement and fill volumes differ because the volume displaced by the piston rod 11, more oil is displaced "from the right than can be filled into the left. The difference amount flows out via the pressure valve 18 into the hydraulic tank 19.

Moreover, according to the invention, after the piston rod 11 begins to interlock with the counter-piece 13 (time $t_1$), a defined hydraulic stream $dV_1/dt$ (see FIG. 2) is additionally conducted to the cylinder 9 through the inflow 14. This hydraulic stream is equal to or less then the value obtained by multiplying the effective piston surface A in the left cylinder chamber by the speed $v_0$. In FIG. 3, the volume flow as a function of time, $dV_1/dt$ is shown by the dots and dashes, but divided by the appropriate effective action surface A of the piston, so that the volume flow is converted into a velocity.

In the present case, the volume $dV_1/dt$, begins immediately at the beginning of the interlock; however, a later time for applying this volume flow can also be set. Also, the volume flow need not necessarily be not constant but may be time-variable. In any event, for reasons of transparency, a constant flow has been chosen in the embodiment.

With a given speed $v_0$ and a given volume flow $dV_1/dt$, only a small volume flow of oil thus needs to be conducted via the line 16 into the left cylinder chamber. Only that volume flow must be conducted to the line 16, which is obtained from the difference speed Delta v, see FIG. 3 multiplied by the action surface A. The corresponding $t_1$-$t*$ and Delta v- region which caused a flow in the line 16 is shown cross-hatched in FIG. 3, phase III.

In the embodiment, the tool half initially continues with undiminished speed during phase III, driven solely by the run drive 5. However, as it approaches the closed position, a greater resistance is encountered, for example, because the blow-mold hose is being pinched. Because of a limited power, the run drive 5 is no long able to maintain the speed v of the tool half, as a result of which v declines. Alternatively, the deceleration speed can also be actively controlled by appropriately slowing down the run drive 5. In either case, the speed of the tool is then still greater than the speed obtained when the volume speed $dV_1/dt$ is divided by the effective surface A of the piston 10. Oil therefore continues to flow from the outflow 15, via the line 16, to the inflow 14 to provide the extra volume needed in the "left" cylinder chamber. Naturally, it is also possible to prescribe a specific speed reduction for the run drive 5, as a result of which the speed is reduced when the interlock element 12 enters the counter-piece 13, for example.

When the movable tool half 2 approaches the fixed one, the speed must gradually decrease, and fall to zero when the two halves make contact, see FIG. 3, phase IV. As the closure force rises still more, the run drive 5 is no longer able to move the tool 1, 2 any further. The tool is closed further solely by the closure drives 8. In this case, however, the speed has already dropped below the value $v_1$ so that no compensatory hydraulic fluid flows through the line 16. From here on, the speed of the tool is obtained purely by prescribing the volume flow $dV_1/dt$ which must continue to be conducted to the inflow 14 until the tool is completely closed. Of course, this volume flow declines continuously in accordance with the desired speed profile as shown during phase IV in FIG. 3). This is accomplished by an appropriate control regulation mechanism until the tool is completely closed at the time $t_2$.

Precisely during the last stages of closure in phase IV, the speed is very important. Consequently, the arrangement generally is such that during phase IV, the speed is again briefly increased shortly before the tool is closed as shown by the brief peak at the conclusion of phase IV. The reason for this is that, precisely during this last closure stage, the speed is decisive for forming the weld seal. Shortly before the blow mold is completely closed, the speed is increased once again, so that this so-called follow-up will keep the residual film and thus later-flash removal as minimal as possible.

The decisive moment for the transition from run drive to closure drive is $t*$. The motion of the run drive 5 plays no role any longer, and the motion is accomplished solely by the closure drive 8. Beginning at $t*$, the pressure automatically is built up in the closure cylinders 9, as result of which the closure force can develop. The interlock between the piston rods 11 and the counter-pieces 13 must be completed at the latest by time $t*$. At this time, the speed $v_1=(dV_1/dt) \times 1/A$ (see FIG. 3).

To close the tool 1, 2, the pistons 10 in the closure drives 8 are first brought to their "forward" stop; this position is shown in FIG. 1 for the uppermost of the two closure drives 8. In general, it is only important that the piston rod 11 assumes a definite position in the cylinder 9. This requirement in particular makes it possible that no more attention needs to be paid to the motion of the piston rod 11 during the further closure process by means of the proposed closure method. In contrast to the usual procedure in the prior art, it is no longer necessary to query where the piston rods are currently positioned and to account for this appropriately in the control.

For removing the finished work piece, the piston rods 11 are run in reverse by means of the closure drives 8, so that they no longer oppose removal from the mold. This position is shown for the lower most of the two closure drives 8 in FIG. 1. After the blow-molding process has been completed, the tool is opened by the run drive 5.

The design of the apparatus and the mode of operation that have been described assure the following characteristics: 1) a soft transition takes place from run drive phase to closure drive phase; 2) a simple and consequently economical and reliable closure apparatus is used; 3) no coordination or regulation problems exist between the operating phases of the run drive and closure drive, with the following result: a central and common control or regulation mechanism can be used for all the closure drives 8, without needing a synchronization device for the individual closure drives, while at the same time a continuous closure process without interruptions is assured.

In an advantageous development, the length L of the closure cylinder 9 is much longer than would be necessary for closing the tool in the manner indicated above. The result of this is that, in order to change the tool, the piston rod 11 can be completely removed from the region of the tool 1, 2 or of the tool mounting plates 3, 4. This makes it much easier to change the tool.

Although the discussion relates to closure of the tool, the inventive process can be used analogously to open the tool again after the blow-molding process has been completed.

While this invention has been particularly shown and described with references to preferred embodiments thereof, it will be understood by those skilled in the art that various changes in form and detail may be made therein without departing from the spirit and scope of the invention as defined by the appended claims.

We claim:

1. A method for closing a tool of a plastics-processing machine that has at least two parts supported by respective tool-mounting plates, the method comprising:

operating at least one run drive to move the tool from an open position to near a closed position;

interlocking an end of piston rods of plural closure drives with counter-pieces to enable the closure drives to close the tool after the tool is situated near its closed position;

operating the closure drives from a common controller regulation mechanism to move the tool into the closed position; and performing the entire closure motion of the tool continuously and without interruption of the closure process.

2. A method as claimed in claim 1, further comprising:
conducting a predetermined hydraulic stream into cylinders of the closure drives after the piston rods interlock with the counter-pieces;
enabling transfer from an outflow of the cylinders to an inflow via a check valve; and
enabling the outflow to reach a hydraulic tank through a pressure valve.

3. A method as claimed in claim 2, further comprising placing the piston rod in a forward stop position before interlocking the piston rod with the counter-piece.

4. A method as claimed in claim 1, further comprising a blow-molding a parison in the tool.

5. A method as claimed in claim 1, further comprising operating the run drive with a longer stroke than the closure drives.

6. A method as claimed in claim 1, further comprising producing larger forces from the closure drives than the run drive.

7. A method as claimed in claim 1, further comprising providing no synchronization devices between the individual closure drives.

8. An apparatus for closing a tool of a plastics-processing machine that has at least two parts, the apparatus comprising:
at least one run drive which moves the tool from an open position to near a closed position;
at least two closure drives which move the tool into its closed position and have a shorter stroke and produce a higher force than the run drive, each of the closure drives including a hydraulic piston-cylinder system with a cylinder having inflow and an outflow for hydraulic oil, a piston in the cylinder, and a piston rod connected to the piston and having an interlock element near an end thereof; and
counter-pieces which interact with the interlock elements only after the tool is situated near its closed position;
a controller regulation mechanism which conducts a predetermined hydraulic stream to the cylinders via the inflow after the piston rods interlock with the counter-pieces;
a connecting line with a check valve for conducting the hydraulic oil from the outflow to the inflow of the cylinders; and
a hydraulic tank for receiving at least a portion of the outflow through a pressure valve.

9. An apparatus as claimed in claim 8, wherein the cylinders of the closure drives have a sufficient length to enable the piston rods, together with the interlock elements to be run out completely from a region of the tool area and/or a region of a tool mounting plate on which the tool is mounted.

10. A method for closing a tool of a plastics-processing machine, the method comprising:
moving the tool from an open position to near a closed position with at least one run drive;
interlocking at least one closure drive associated with one part of the tool with a counter-piece associated with another part of the tool after the tool is situated near its closed position to enable the closure drive to close the tool; and
operating the at least one closure drive simultaneously with the at least one run drive to provide continuous operation.

11. A method as claimed in claim 10, further comprising enabling the run drive to continue to close the tool after the interlocking of the at least one closure drive with the counter-piece.

12. A method as claimed in claim 11, wherein the step of the closing the tool after the interlocking includes enabling transfer from an outflow of cylinders of the at least one closure drive to an inflow via a check valve.

13. A method as claimed in claim 12, further comprising enabling the outflow of the cylinders of the least one closure drive to reach a hydraulic tank through a pressure valve.

14. A method as claimed in claim 10, further comprising conducting a predetermined hydraulic stream into cylinders of the at least one closure drive after the interlocking with the counter-piece.

15. A method as claimed in claim 10, further comprising placing piston rods of the closure drives in a forward stop position before interlocking the piston rods with the counter-piece.

16. A method as claimed in claim 10, further comprising blow-molding a parison in the tool after closure.

17. A method as claimed in claim 10, further comprising operating the run drive over a longer stroke than the at least one closure drive is operated.

18. A method as claimed in claim 10, further comprising producing larger forces from the at least one closure drive than the run drive.

19. An apparatus for closing a tool of a plastics-processing machine, the apparatus comprising:
at least one run drive, which moves the tool from an open position to near a closed position;
at least one closure drive, which moves the tool into its closed position and has an interlock element;
a counter-piece corresponding to each closure drive, which interacts with the interlock element only after the tool is situated near its closed position to enable the closure drive to close the tool;
a single controller regulation mechanism, which conducts a hydraulic stream to each closure drive cylinder; and
a system which reduces a resistance exerted by the closure drive to the movement of the tool generated by the run drive.

20. An apparatus as claimed in claim 19, wherein the system comprises a check valve for conducting hydraulic fluid from an outflow to an inflow of a cylinder of the closure drive.

21. An apparatus as claimed in claim 20, wherein the system further comprises a hydraulic tank for receiving at least a portion of the outflow through a pressure valve.

22. An apparatus as claimed in claim 20, wherein the cylinder of the closure drive has a sufficient length to enable piston rods of the closure drive, together with the interlock elements to be run out completely from a region of the tool area and/or a region of tool mounting plate on which the tool is mounted.

23. In a plastics-processing machine including a machine base, two mold mounting plates extending from the base, and at least one of which is moveable on the base level, a blow-molding tool, parts of which are supported by the mounting plates, a tool closure apparatus comprising:
at least one run drive, which moves the tool from an open position to near a closed position;
at least one closure drive, which is mounted on a first one of the mounting plates and includes a shaft, an interlock element on the shaft, and a cylinder housing a piston to which the shaft is connected;
a counter-piece mounted on a second one of the mounting plates, which interacts with the interlock element only after the tool is situated near its closed position to enable the closure drive to close the tool;

a hydraulic system which reduces a resistance exerted by the closure drive to the movement of the tool generated by the run drive by enabling fluid flow between an outflow port of the cylinder to an inflow port.

24. An apparatus as claimed in claim 23, wherein the system further comprises a hydraulic tank for receiving at least a portion of the outflow through a pressure valve.

25. An apparatus as claimed in claim 23, wherein the cylinder of the closure drive has a sufficient length to enable the shaft of the closure drive, together with the interlock element to be run out completely from a region of the tool area and/or a region of the tool mounting plates.

26. A method as claimed in claim 1, further comprising conducting hydraulic streams into each cylinder of the plural closure drives at a common rate after the piston rods interlock with the counter-pieces.

27. A method as claimed in claim 10, further comprising conducting an hydraulic stream into cylinders of the plural closure drives at a common rate to coordinate operation of the closure drives.

28. An apparatus as claimed in claim 19, further comprising plural closure drives in which the controller regulation mechanism conducts the hydraulic stream into the closure drives at a common rate after actuation of the interlocks.

29. An apparatus as claimed in claim 23, further comprising plural closure drives in which the hydraulic system conducts an hydraulic stream into the closure drives at a common rate.

* * * * *